Figure 1:
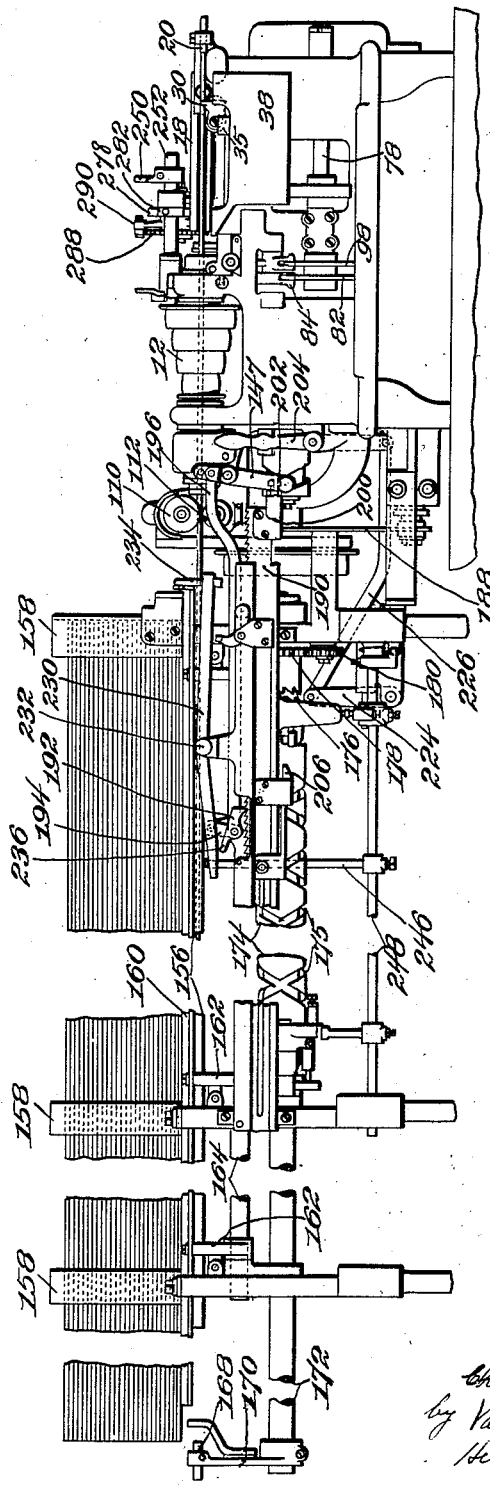

Oct. 13, 1931.  C. A. RICH  1,826,953
SCREW AND SIMILAR MACHINE
Filed Jan. 16, 1929  6 Sheets-Sheet 1

Oct. 13, 1931.  C. A. RICH  1,826,953
SCREW AND SIMILAR MACHINE
Filed Jan. 16, 1929   6 Sheets-Sheet 5

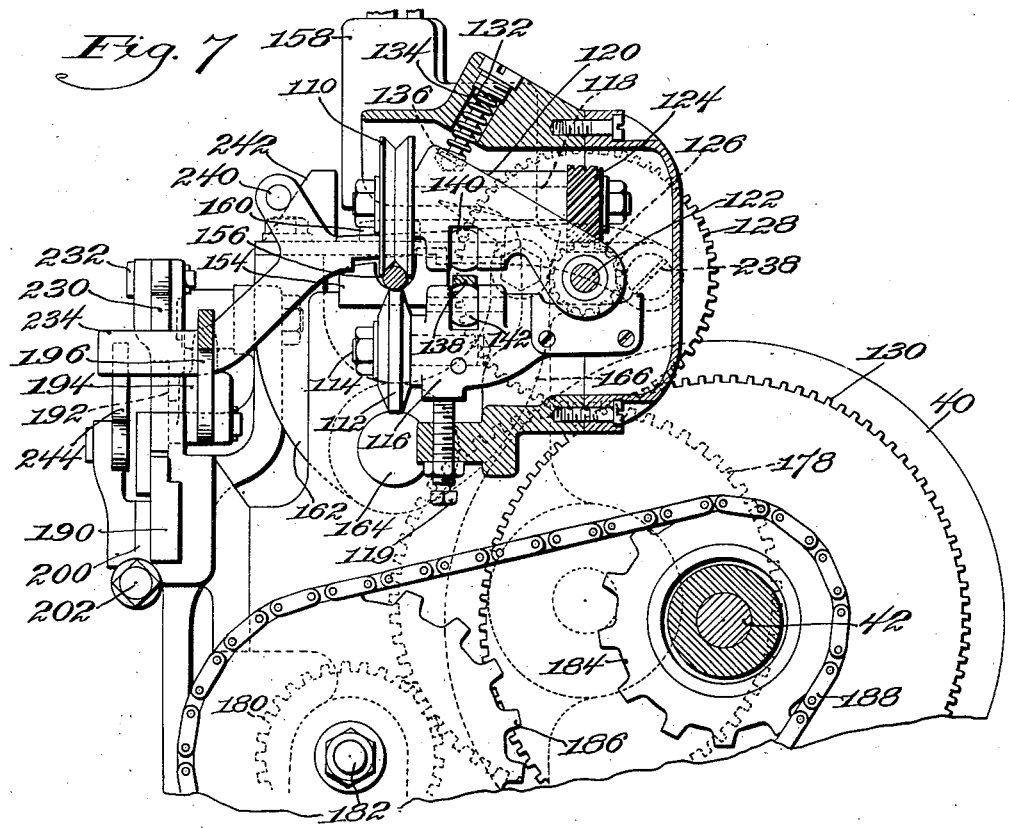

Patented Oct. 13, 1931

1,826,953

UNITED STATES PATENT OFFICE

CHARLES A. RICH, OF PROVIDENCE, RHODE ISLAND, ASSIGNOR TO BROWN AND SHARPE MANUFACTURING COMPANY, A CORPORATION OF RHODE ISLAND

SCREW AND SIMILAR MACHINE

Application filed January 16, 1929. Serial No. 332,830.

The present invention relates to screw and similar machines for producing articles successively from bar stock and more particularly to devices for automatically placing new pieces of stock in the machine as needed which are well adapted for use in machines producing articles which are long as compared to the work usually produced on automatic screw machines.

One object of the invention is to provide in a machine of this description, novel and improved mechanisms for handling the bar stock to be operated upon and for ejecting the sections comprising the finished product as they are severed from the bar.

A further object of the invention is to provide a novel and improved means for causing the forward end of a new bar placed in the machine to be trimmed to the required shape whereby a considerable saving of material may be effected over the methods more usually employed for this purpose.

The machine herein disclosed as embodying the invention comprises a cutting-off machine which is provided with a magazine for storing additional stock and an automatic magazine feed for transferring new pieces of stock to the machine as needed, this magazine and feed being similar in many respects to the magazine and magazine feed described and illustrated in applicant's pending application, Serial No. 233,753, filed November 17, 1927.

In the machine of applicant's pending application above referred to, which is particularly adapted for use in the manufacture of the usual screw machine products, mechanism is provided for throwing the automatic magazine feed into operation which is actuated by the passing of the old bar of stock. With the cutting-off machine herein disclosed which is adapted to produce articles of comparatively greater length, the bar is exhausted and it becomes necessary to place a new piece of stock in the machine after a relatively small number of fashioning and cutting-off operations. Since this number can be readily determined from a comparison of the length of the stock and the articles to be produced therefrom, one feature of the invention is directed to the provision of a particularly convenient and efficient means for rendering the automatic magazine feed operative to place a new bar of stock in the machine which comprises a timing device adapted to act automatically at intervals after a predetermined number of operations to cause a new bar to be placed in the machine.

When a new bar of stock is put into the machine, the leading end must be trimmed to form one end of the first finished article to be made from this bar. In the operation of the machine of the applicant's pending application which is adapted for the manufacture of the usual screw machine products and is further provided with an automatic magazine feed, a new bar is fed against the positioning stop and the first article formed is discarded if imperfectly finished at the raw end. With a cutting-off machine, however, such as that herein described, which is adapted to produce unusually long articles, a very considerable waste of material is caused by the loss of one length from each bar of stock to trim the new end. Another feature of the present invention, therefore, consists in the provision of means for enabling the first end of a new bar to be trimmed to the required shape with a minimum loss of material. To this end, a swing stock stop is provided which acts upon the insertion of a new bar of stock in the machine to position the bar for a preliminary cutting-off operation.

The several features of the invention also consist in the combinations, devices, and arrangement of parts hereinafter described and claimed which together with the advantages to be obtained thereby, should be readily understood by one skilled in the art from the following description taken in connection with the accompanying drawings.

Figure 2:
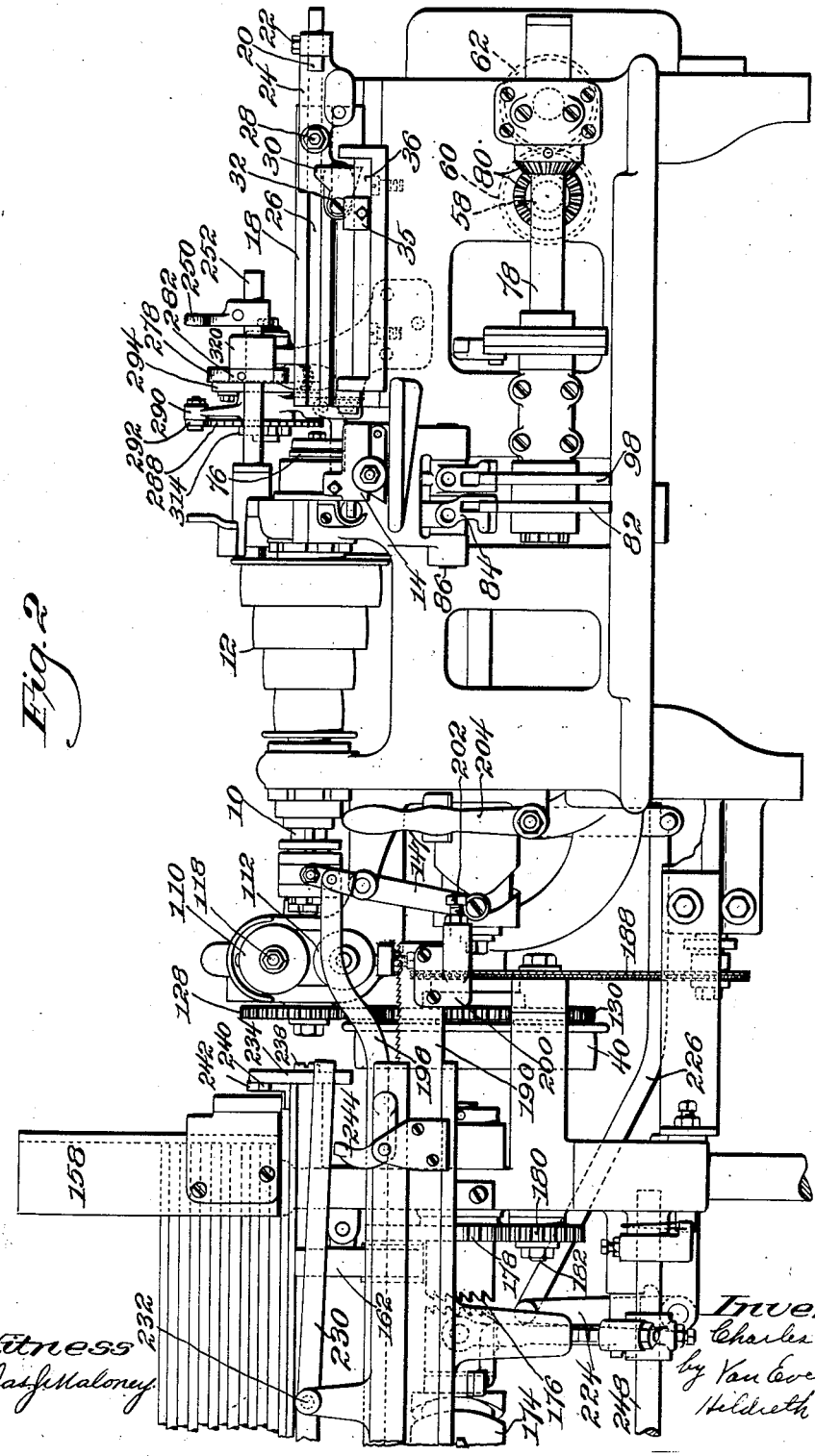
Figure 3:
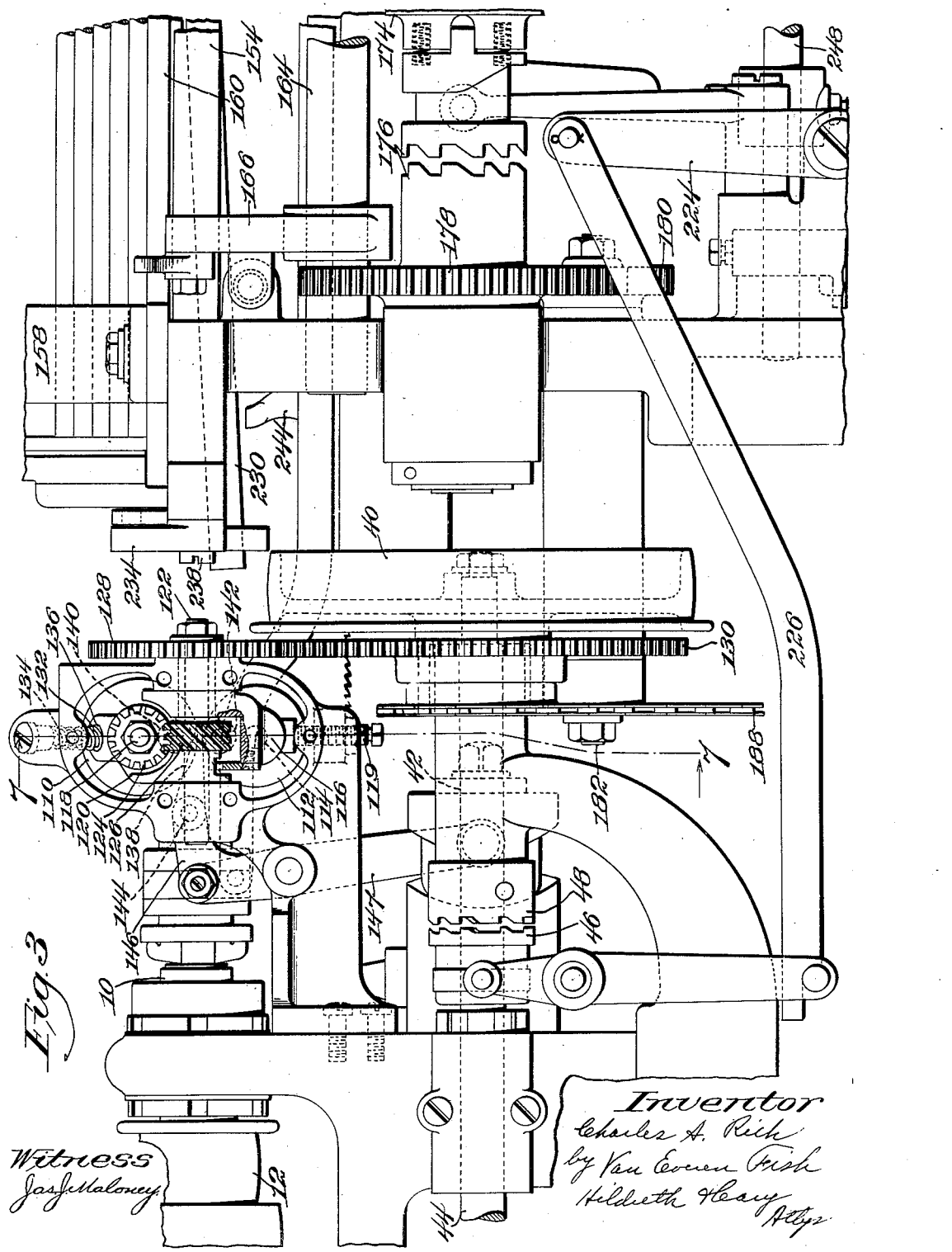
Figure 4:
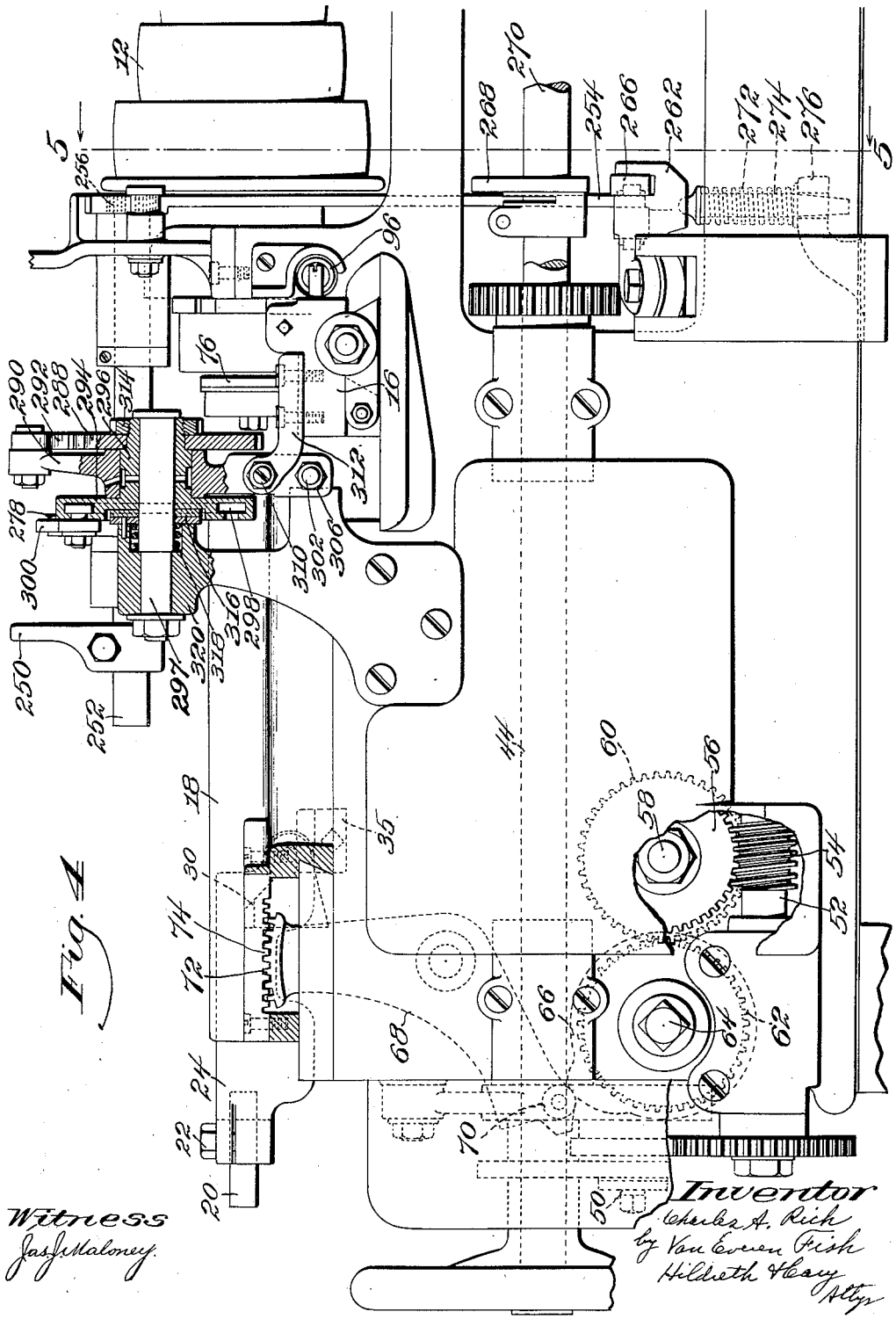
Figure 5:
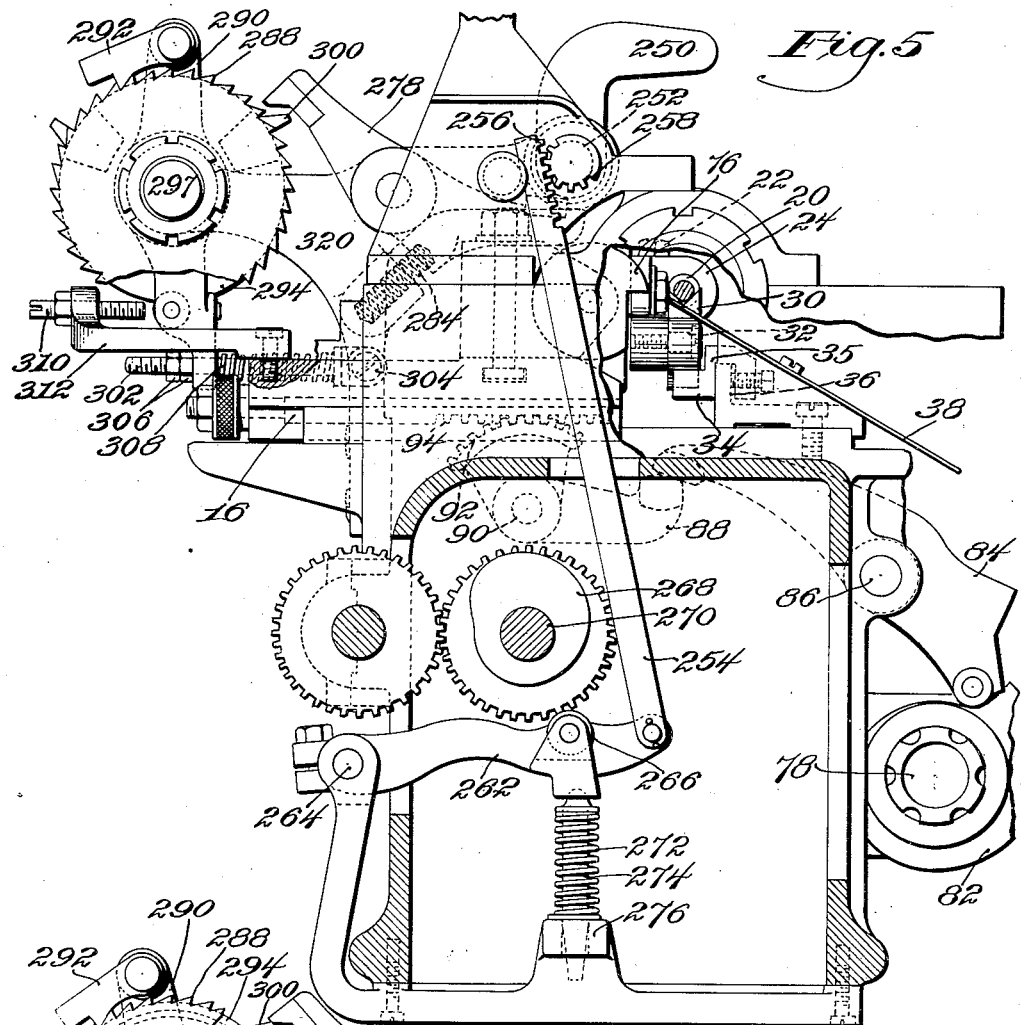
Figure 6:
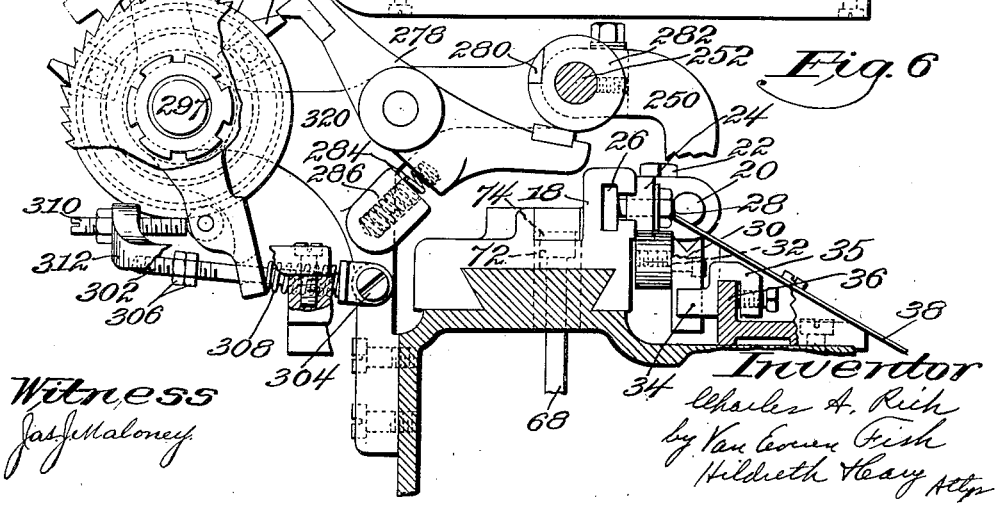

In the drawings, Fig. 1 is a view in front elevation of a cutting-off machine provided with an automatic magazine feed; Fig. 2 is a view in front elevation on an enlarged scale of the cutting-off machine and a portion of the magazine shown in Fig. 1; Fig. 3 is a view in rear elevation on an enlarged scale of a portion of the machine shown in Fig. 1 illustrating particularly the roller feed and certain of the driving connections; Fig. 4 is a view in rear elevation forming substantially a continuation of Fig. 3 and illustrating particularly the drive for the turret slide and a section of the timing device for throwing the swing stop into operation; Fig. 5 is a sectional view taken substantially on the line 5—5 of Fig. 4; Fig. 6 is a view similar to Fig. 5 but with the swing stop shown in operative position; and Fig. 7 is a sectional view taken on the line 7—7 of Fig. 3.

The cutting-off machine herein disclosed as embodying the several features of the present invention is similar in many respects to the automatic screw machine illustrated in the applicant's above-mentioned application, with certain changes designed particularly to adapt it for use in producing articles of comparatively great length.

The hollow rotary spindle through which the stock is fed is indicated at 10, provided with belt pulleys 12 through which it is driven. A front cross slide is shown at 14, a rear cross slide at 16, and a longitudinally movable slide at 18 which takes the place of the turret slide ordinarily supplied with automatic screw machines.

The stock stop against which the bar stock is fed to position the bar for the cutting-off operations is mounted on the slide 18 and comprises a stop 20 which is adjustably secured by a set screw 22 in a bracket 24. In order to permit a wide range of adjustment of the stop 20 and consequently of the length of the articles produced, the bracket 24 is mounted to slide in a T-shaped slot 26 which is formed in the slide 18 parallel to the bar stock and is clamped in position in the slot 26 by means of a clamping bolt 28. A support 30 is provided for the bar stock at a point adjacent to the stock stop and is pivotally secured to the bracket 24 by means of a pin 32. For the normal position of the slide 18, the support 30 is held in a raised operative position by the engagement of a cam shaped under surface of the support with a corresponding abutment 34 in a bracket 35 on the machine frame. This bracket may be adjusted along a supporting ledge 36 and clamped securely in position, so that the position of the abutment can be made to correspond to the adjusted position of the bracket 24.

At the end of each cutting-off operation, the slide 18 carrying the support 30 and the stop 20 is given a momentary movement away from the spindle to release the finished product. During this retracting movement of the slide 18, the cam shaped surface of the support 30 riding on the abutment 34 permits the support to drop leaving the finished piece of stock free to roll down a guard 38 provided for this purpose into a suitable container. The slide and stop 20 then return to their normal position and the support 30 is again raised preparatory to the next feeding movement of the bar stock.

The cross slides 14 and 16 and the slide 18 are actuated from a belt pulley 40 on a driving shaft 42 through connections which include an abutting shaft 44 connected to the driving shaft 42 by means of a main driving clutch comprising the clutch members 46 and 48. At its outer end, the shaft 44, see Fig. 4, is connected through gears indicated in dotted lines, to a shaft 50 which is in turn connected to a shaft 52 which carries a worm 54 adapted to engage a corresponding worm gear 56 on a cross shaft 58. This shaft in turn acts through gears 60 and 62 to drive a parallel shaft 64 which carries an actuating cam 66. The slide 18 is actuated from the cam 66 through a cam lever 68 which is provided at one end with a cam roll 70 adapted to ride on the cam 66 and at its other end with a gear segment 72 which engages a corresponding rack 74 formed on the under side of the slide 18.

The rear cross slide 16 which carries the cutting-off tool 76 is driven from a cam shaft 78 as shown in Figs. 2 and 5, connected through the beveled gears 80 with the cross-shaft 58. A cam 82 is mounted on the shaft 78 to engage with a cam roll carried on one end of a lever 84 pivoted at 86 on the machine frame. At its upper end the lever 84 is provided with a bearing surface which engages with a corresponding surface on a lever 88 pivoted at 90 and provided with a gear segment 92 adapted to engage with a corresponding rack 94 on the rear cross slide 16. The arms of the levers 84 and 88 are held in engagement with each other and the cam roll is held in engagement with the cam 82 by means of a tension spring indicated at 96, see Fig. 4, which tends to hold the slide in open position. The cross slide 14 when in use is actuated through suitable connections, not shown, by a cam 98 mounted on the shaft 78 beside the cam 82.

In order to secure a rapid and efficient operation of the feeding mechanism to impart the relatively long feeding movements required to the bar stock, a roller feed is provided which comprises a continuously rotating driver 110 and an idler 112 adapted to frictionally engage the bar stock at intervals to drive it against the stock stop 20 in position for a new cutting-off operation. The idler roller 112 which forms the lower element of the combination is mounted on a fixed pivot 114 held in a stationary bracket 116. This bracket is pivotally mounted upon a shaft 122 and at its free end rests upon a set screw 119 by means of which the vertical position of the bracket and roll 112 may be adjusted. The driver 110 forming the upper element is secured to one end of a shaft 118 which is rotatably mounted in a carriage 120 which is pivotally mounted to swing about the shaft 122 journaled in the machine frame. The shaft 118 carries at its rear end a worm gear 124 which engages with a corresponding gear 126 formed on the shaft 122. This shaft is in turn continuously driven from the main belt pulley 40 through connections which include the gear 128 which meshes with a gear 130 secured to the main driving shaft 42. The carriage 120 is forced yieldingly in a direction to hold the driver 110 in frictional engagement with the stock being fed to the machine by means of the compression spring 132 which is mounted in a recess 134 in the casing of the machine, and bears against a corresponding recess 136 in the carriage 120. The mechanism by means of which the carriage 120 is permitted to move under the pressure of its spring 132 to bring the rollers 110 and 112 into feeding engagement with the work and is then moved back against the spring pressure at the end of the feeding movement comprises a wedge-shaped member 138 which engages between two rollers 140 and 142 mounted respectively in the carriage 120 and the bracket 116. The wedge-shaped member 138 is pivotally secured at 144 to an arm 146 which is rigid with the usual cam actuated chuck lever 147 which is actuated in timed relation to the slides 16 and 18 and causes the bar of stock to be clamped at the end of each feeding movement so as to rotate with the spindle.

The automatic magazine feed herein disclosed is similiar in many respects to that described in the applicant's above-mentioned pending application. A guideway comprising a long supporting member 154 having a groove 156 adapted to receive a single piece of stock is provided in alignment with the feed-tube of the machine. The magazine is mounted directly above the supporting member 154 and comprises a series of narrow frames 158 adapted to hold a single series of bars one above the other. This column of reserve bars is supported by a long narrow plate 160 forming part of an assembly which normally closes the lower end of the magazine and also acts as a cap to hold the bar being fed into the machine in the groove. In order to permit new bars to be fed from the magazine into the groove, the plate 160 is supported by a series of arms 162 formed on a rock shaft 164 so that the plate 160 may be withdrawn to permit a new bar to be discharged from the magazine. A series of flanged arms 166 also mounted on the rock shaft 164, are at the same time moved into position between the lowest bar in the magazine and those above so that only one bar at a time can be discharged.

The new bar is moved along the guideway 156 into contact with the feed rollers 110 and 112 by means of a feed plunger 168 which is rigidly secured to an arm 170 on a feed slide bar 172 and is adapted to engage with the rear end of the new piece of bar stock. The mechanism for actuating the rock shaft 164 to permit a new bar to be placed in the guideway 156 and for actuating the feed slide bar 172 comprises a roll cam 174 provided with suitable cam surfaces including a spiral cam groove 175 for controlling the feed slide. The roll cam 174 is connected through a clutch 176, gears 178 and 180, to a shaft 182 which is in turn driven from the main driving shaft 42 through sprockets 184 and 186 and sprocket chain 188.

The automatic magazine feed is thrown into operation to place a new piece of stock in the machine on the exhaustion of the old bar by means of a novel and improved timing mechanism which embodies certain features of the present invention and is particularly well adapted for use in a cutting-off machine of the type herein described producing articles of such length that only a few can be made from each bar of stock. As distinguished from the timing mechanism employed in the applicant's above-mentioned automatic screw machine application for throwing the automatic feed into operation which is rendered operative by the passing of the old bar, the timing device herein disclosed acts periodically after a number of cutting-off operations which is determined in advance in accordance with the length of the stock employed, and the length of the articles being produced.

As in applicant's pending application above referred to, a rack bar 190 is provided which is given a step-by-step feeding movement, in timed relation to the feeding movements imparted to the piece of stock in the machine, by means of a pawl 192. The rack bar is provided with a number of dogs which are adapted to come into contact with corresponding lever arms to disengage the machine clutch and also to throw into operation the mechanism for selecting and inserting the new piece of stock in the machine. After a new piece of stock has been inserted in the machine, the rack bar is returned to starting position by the return movement of the slide 172. In the present construction, the pawl 192 instead of being held out of engagement with the rack bar after the return of the rack bar to its initial position, is at once released so that, as the machine is again put into operation, the rack bar is moved forward a step during each cycle of the machine in feeding forward and cutting a piece from the stock. The rack bar is carried back to a starting position which is carefully adjusted in accordance with the length of stock and the length of the articles being produced to cause a number of rack teeth to be acted upon by the pawl 192, before the machine is stopped and the mechanism for selecting and inserting a new piece of stock is thrown into operation, which exactly corresponds to the number of feeding operations required to exhaust the bar of stock.

The pawl 192 is pivoted to the lower end of a short vertically situated lever 194 and is given a continuous reciprocatory movement by means of a link 196 connected at one end to the lower end of the lever 194 and at its other end of the chuck lever 147. A bracket 200 is secured to the forward end of the rack bar 190 and is provided with an adjustable dog 202 which engages with and throws the starting and stopping lever 204 of the machine to the right, as viewed in Fig. 1, to throw out the machine clutch comprising the members 46 and 48 to stop the machine. At the same time that the starting and stopping lever 204 is thrown over to release the machine clutch, a cam shaped dog 206 acts through mechanism which is more fully described in applicant's application above referred to, to close the clutch 176 and throw the mechanism for selecting and inserting a new piece of stock into operation.

The rotation of the roll cam 174 after the clutch 176 is closed, as above pointed out, acts first to rock the shaft 164 to allow a new bar to fall into the guideway 156, and then causes the feed bar 172 to be advanced to ring the new piece of stock into contact with the feed rollers 110 and 112. At the end of the forward movement of the feed slide bar 172, an abutment on the bar engages a lever 224 and a connecting link 226 to return the machine clutch to operative position. During the return movement of the feed slide bar, the rack bar 190 is retracted to its original position and finally the clutch 176 is thrown out to stop further movement of the roll cam 174.

Since it is necessary during the retracting of the rack bar 190 to its starting position to hold the pawl 192 out of contact with the teeth of the rack bar, a lever 230 is mounted substantially parallel with the rack bar 190 to turn on a pivot 232 on the machine frame, and is supported at one end on a cross lever 234. The free end of the lever 230 overlies a tail 236 formed on the pawl 192, but for the normal position of the cross lever 234 is held out of contact with the tail 236 of the pawl to permit a free engagement of the continuously reciprocating pawl with the teeth of the rack bar 190. The cross lever 234 is pivoted at 238 on the machine frame and is held in a high or low position to control the effective movement of the pawl 192 by the engagement of a cam roll 240 on the lever with a cam surface 242 formed on an arm 162. When the rack bar 190 reaches the limit of its forward movement so that the automatic magazine feed is thrown into operation, causing the shaft 164 to be rocked to bring a new bar from the magazine into the guideway 156, the movement of the cam surface 242 with relation to the role 240 acts to raise the cross lever 234 and swings the lever 230 about its pivot to disengage the pawl 192 from the teeth of the rack bar 190. The cross lever 234 and the lever 230 are maintained in raised position to hold the pawl 192 out of contact with the teeth in the rack bar when the rock shaft 164 is returned to its normal position by means of a small latch lever 244 which is pivotally mounted on the rack bar 190 and comes into position under the cross lever 234 as the rack bar reaches its foremost position. The pawl is held out of operation during the retracting movement of the rack bar 190 with the feed slide bar 172 by the engagement of a curved lever arm 246 mounted on a rock shaft 248 which forms one of the connections for disengaging the clutch 176 at the end of the retracting movement of the feed slide bar 172. The shaft 248 is rocked during the feeding movement of the feed slide 172 to lock the clutch 176 in closed position, at the same time swinging the lever 246 into engagement with the lever 230. The pawl 192 is finally released by the lever arm 246 so that a step-by-step advancing movement is imparted to the rack bar 190 when the shaft 248 is rocked to disengage the clutch 176 at the end of the retracting movement of the feed slide bar 172.

In order to trim the leading end of a new bar of stock being fed into the machine so that the first article produced will be finished in all respects, and to eliminate so far as possible any waste of material, a swing stop is provided which is interposed to stop the feeding of a new bar at a point adjacent to the cutting-off tool and is similar to the swing stock stop illustrated in the applicant's above-mentioned application. The swing stop, indicated at 250, is secured to a rock shaft 252 and is actuated in timed relation to the cutting-off operation through connections including a rack bar 254 which is provided at its upper end with rack teeth 256 adapted to engage with a gear segment 258 on the shaft 252 and at its lower end is pivotally secured to a cam lever 262 which is in turn mounted on a pivot 264. A cam roll 266 on the lever 262 is held yieldingly in engagement with a cam 268 on a shaft 270 to impart the required movements to the swing stop 250 by means of a compression spring 272 coiled about a plunger 274 and interposed between the lever 262 and a support 276 on the machine frame. During the normal operation of the machine, the swing stop 250 is held out of operation against the pressure of the compression spring 272 by the engagement of a latch lever 278 with a corresponding recess 280 formed in a disk 282 on the rock shaft 252. The latch lever 278 is forced yieldingly in a direction to maintain contact with the recess 280 by means of a compression spring 284 which is held in a recess 286 in a fixed portion of the machine.

In order to permit the swing stock stop 250 to be rendered operative at the required intervals in the operation of the machine to position the first end of each new bar for a preliminary cutting-off or trimming operation, a timing mechanism is provided which acts to trip the latch lever 278 and allows the stop 250 to swing into operative position under the influence of the cam 268. The timing mechanism comprises a ratchet wheel 288 which is given a step-by-step movement for each cutting-off operation of the machine by means of a ratchet lever 290, which is loosely mounted to turn concentrically with the ratchet wheel 288 and is provided with a pawl 292 adapted to engage with the teeth of the ratchet wheel. In order to release the swing stop lever 250 for a preliminary cutting-off operation on a new bar after a predetermined number of feeding movements of the ratchet wheel 288, a disk 294 is formed on a hub 296 to turn with the ratchet wheel 288 on a stub pivot shaft 297 and has an annular groove 298 formed in one face of the disk within which are mounted adjustable stops 300 which are adapted to engage and trip the latch lever 278 for holding the swing stop out of operation.

The ratchet lever is normally held yieldingly in an upright position by connections which include a bar 302 which is pivotally mounted at 304 on the machine and extends through an aperture formed in the lower end of the ratchet lever 290. An adjustable stop comprising the nuts 306 on the threaded end of the bar 302 is provided to limit the movement of the ratchet lever 290 in one direction and a compression spring coiled about the bar 302 and inserted between an abutment at the pivoted end of the bar and the ratchet lever 290 is provided to hold the lever yieldingly in position against movement in the opposite direction. The ratchet lever 290 is moved against the pressure of the compression spring 308 to impart a step-by-step feeding movement to the ratchet wheel by the engagement of the lower end of the lever with an adjustable stop 310 which is mounted on a bracket 312 fastened to the rear cross slide 16. By means of the adjustable stops 306 and 310, the extent of the movements imparted to the ratchet wheel may be regulated as desired.

Inasmuch as the number of cutting-off operations required before it is necessary to place a new bar in the machine will vary widely with the length of the work produced and also with the length of the stock employed, it is often desirable to substitute ratchet wheels having different numbers of teeth to produce the desired result. For convenience in assembling the parts and to facilitate this change, the ratchet wheel 288 is clamped securely against the shoulder on the hub 296 carrying the disk 294 by means of a nut 314 screw threaded on the end of the hub 296. The ratchet lever 290 is loosely mounted to turn on a bearing formed on the hub 296 between the ratchet wheel and the disk 294. In order to prevent undue movement of the ratchet wheel 288 and also to provide a simple and efficient construction for holding the ratchet in position and against backward movement with the pawl 292, a friction brake is provided at one end of the hub 296 comprising the friction plates 316 which are held yieldingly in engagement by means of a compression spring 318 which is coiled about the shaft 297 within a recess in the supporting bracket 320 for the shaft.

The invention having been thus described, what is claimed is:

1. A machine for producing articles successively from bar stock having, in combination, a hollow spindle through which the bar stock is fed, a cutting-off tool, means for feeding a bar past the cutting-off tool the length of an article between successive cutting-off operations, a stop to engage a new piece of stock after being fed past the tool less than the length of an article to position the leading end of the bar for a preliminary trimming operation, and means acting automatically upon introducing a new bar into the machine to move said stop into operative position.

2. A machine for producing articles successively from bar stock having, in combination, a hollow spindle through which the bar stock is fed, means for feeding the bar stock, a cutting-off tool, a stop to engage the bar after being fed past the cutting-off tool the length of an article between successive cutting-off operations and an auxiliary stop to engage a new piece of stock after being fed past the cutting-off tool less than the length of an article to position the leading end of the bar for a preliminary trimming operation.

3. A machine for producing articles successively from bar stock having, in combination, a hollow spindle through which the bar stock is fed, means for feeding the bar stock, a cutting-off tool, a stop to engage the bar after being fed past the cutting-off tool the length of an article between successive cutting-off operations, an auxiliary stop to engage a new piece of stock after being fed past the cutting-off tool less than the length of an article to position the leading end of the bar for a preliminary trimming operation, and means acting automatically to move said auxiliary stop into operative position upon the exhaustion of the old bar.

4. A machine for producing articles successively from bar stock having, in combination, a hollow spindle through which the bar stock is fed, means for feeding the bar stock, a cutting-off tool, a stop to engage the bar after being fed past the cutting-off tool the length of an article between successive cutting-off operations, an auxiliary stop to engage a new piece of stock after being fed past the cutting-off tool less than the length of an article to position the leading end of the bar for a preliminary trimming operation, and means acting automatically to move said auxiliary stop into operative position after a predetermined number of cutting-off operations.

5. A machine for producing articles successively from bar stock having, in combination, a hollow spindle through which the bar stock is fed, a cutting-off tool, means for feeding a bar past the cutting-off tool the length of an article between successive cutting-off operations, a magazine for storing additional bar stock, devices for moving a new piece of stock from the magazine into engagement with said feeding means, and a stop to engage said new piece of stock after being fed past the tool less than the length of an article to position the leading end of the new bar for a preliminary trimming operation.

6. A machine for producing articles successively from bar stock having, in combination, a hollow spindle through which the bar stock is fed, a cutting-off tool, means for feeding a bar past the cutting-off tool the length of an article between successive cutting-off operations, a magazine for storing additional bar stock, devices for moving a new piece of stock from the magazine into engagement with said feeding means, means for throwing said devices into operation periodically, a stop located in advance of the cutting-off tool less than the length of an article, and means for moving said stop into operative position periodically to position the leading end of each bar for a preliminary trimming operation.

7. A machine for producing articles successively from bar stock having, in combination, a hollow spindle through which the bar stock is fed, a cutting-off tool, means for feeding a bar past the cutting-off tool the length of an article between successive cutting-off operations, a magazine for storing additional bar stock, devices for moving a new piece of stock from the magazine into engagement with said feeding means, means operative after a predetermined number of cutting-off operations to throw said devices into operation, a stop located in advance of the cutting-off tool a distance less than the length of an article, and means operating after a predetermined number of cutting-off operations to move said stop into operative position to position the leading end of each new bar for a preliminary trimming operation.

8. A machine for producing articles successively from bar stock having, in combination, a hollow spindle through which the bar stock is fed, a cutting-off tool, means for feeding a bar past the cutting-off tool the length of an article between successive cutting-off operations, a stop located in advance of the cutting-off tool a distance less than the length of an article, mechanism for moving the stop into operative position to position the leading end of each bar for a preliminary trimming operation, and means for controlling the operation of said mechanism comprising a timing mechanism actuated during each cutting-off operation.

9. A machine for producing articles successively from bar stock having, in combination, a hollow spindle through which the bar stock is fed, means for cutting off successive lengths from a bar of stock being fed into the machine, a stock stop, a support for the bar adjacent the stock stop, and means for moving the support and the stop to facilitate discharge of the cut-off section of the bar.

10. A machine for producing articles successively from bar stock having, in combination, a cutting-off tool, a hollow rotary spindle through which bar stock is fed, means for intermittently feeding the bar stock, a stop against which the bar is fed into position for a cutting-off tool, a slide to which the stop is secured, a movable support for the bar, and means for retracting the slide and moving the support to release the cut-off section of the bar from the support and the stop.

11. A machine for producing articles successively from bar stock having, in combination, a hollow rotary spindle through which the bar stock is fed, means for cutting off successive portions from a bar of stock being fed into the machine, a stock stop, a slide on which the stop is carried, a support for the work pivotally mounted on the slide, an abutment for holding the work support in raised position and means for retracting the slide to free the work from contact with the stock stop and lower the support.

12. A machine for producing articles successively from bar stock having, in combination, a hollow rotary spindle through which bar stock is fed, means for cutting off successive lengths from a bar of stock being fed into the machine, a swing stop, means for swinging the stop into and out of active position in timed relation to the operation of said cutting-off means, and devices for permitting the stop to swing into operative position only after a predetermined number of cutting-off operations to position the end of a new bar for a preliminary trimming operation.

13. A machine for producing articles successively from bar stock having, in combination, a hollow rotary spindle, means for cutting off successive lengths from a bar of stock being fed to the machine, a swing stop, and means acting normally to hold the swing stop out of operative position adapted to permit the stop to swing into operative position once for a predetermined number of cutting-off operations.

14. A machine for producing articles successively from bar stock having, in combination, a hollow rotary spindle, means for cutting off successive lengths from a bar of stock being fed to the machine, a swing stop, means for swinging the stop into active position in timed relation to the operation of said cut-off means, and means acting normally to hold the swing stop out of operative position and adapted to release the stop after a predetermined number of cutting-off operations.

15. A machine for producing articles successively from bar stock having, in combination, a hollow rotary spindle, means for cutting-off successive lengths from a bar of stock being fed to the machine, a swing stop, a ratchet wheel, means for advancing the ratchet wheel for each cutting-off operation, and means acting normally to hold the swing stop out of operative position and controlled by said ratchet wheel to release the stop after a predetermined number of cutting-off operations.

16. A machine for producing articles successively from bar stock having, in combination, means for cutting off successive lengths from a bar of stock being fed to the machine, a swing stop, means for swinging the stop into active position in timed relation to the operation of said cutting-off means, a latch adapted to hold the swing stop normally out of operative position, a ratchet wheel advanced for each cutting-off operation, and a dog carried by the ratchet wheel to trip the latch adjustable to vary the number of cutting-off operations before operating the latch.

17. A machine for producing articles successively from bar stock having, in combination, means for cutting successive lengths from the bar of stock being fed to the machine, a swing stop, a ratchet wheel, means acting normally to hold the swing stop out of operative position, means for imparting a step-by-step advancing movement to the ratchet wheel for each cutting-off operation, and means controlled by the said ratchet wheel to release the stop after a predetermined number of cutting-off operations.

18. A machine for producing articles successively from bar stock having, in combination, means for cutting off successive lengths from a bar of stock being fed to the machine, a swing stop, means for swinging the stop into active position in timed relation to the operation of said cutting-off means, a latch adapted to hold the swing stop normally out of operative position, and means for tripping the latch comprising a dog, a disk upon which the dog is mounted provided with a hub, a ratchet wheel removably secured to the hub, a pawl lever pivotally mounted on the hub, a friction device for restraining the movement of the hub disk and ratchet wheel, and means for actuating the pawl lever for each cutting-off operation.

19. A machine for producing articles successively from bar stock having, in combination, a hollow rotary spindle through which the stock is fed, a stock feeding device comprising an idler lower roller fixedly mounted in the machine, a continuously driven upper roller, means for forcing the upper roller yieldingly towards the lower roller to impart a feeding movement to the bar, and a wedge actuated in timed relation to the operation of the machine to raise and release the upper roller.

20. A machine for producing articles successively from bar stock having, in combination, a hollow rotary spindle through which the stock is fed, a stock feeding device comprising a continuously driven roller, a roller cooperating therewith, means for forcing one roller yieldingly towards the other roller to impart a feeding movement to the bar, and a wedge actuated in timed relation to the operation of the machine to separate and release the rollers.

21. A machine for producing articles successively from bar stock having, in combination, a hollow rotary spindle through which the stock is fed, a stock feeding device comprising an idler lower roller fixedly mounted in the machine, a continuously driven upper roller, a bracket on which the said upper roller is mounted to permit movement of the roller towards and away from the lower roller, spring means for engaging with the bracket to force the upper roller yieldingly toward the lower roller to impart a feeding movement to the bar, a wedge actuated in timed relation to the operation of the machine to raise and release the upper roller, and roller bearings mounted respectively on a fixed portion of the machine and on the bracket to engage with the wedge.

22. A machine for producing articles successively from bar stock having, in combination, a hollow spindle through which the bar stock is fed, a cutting off tool, means for feeding a bar past the cutting off tool the length of an article between successive cutting off operations, and means acting automatically upon the exhaustion of the old bar to feed a new bar into the machine and position its leading end less than the length of an article beyond the cutting off tool for a preliminary trimming operation.

23. A machine for producing articles successively from bar stock having, in combination, a hollow spindle through which the bar stock is fed, a cutting off tool, means for feeding a bar past the cutting off tool the length of an article between successive cutting off operations, a magazine for storing additional bar stock, and means acting automatically to move a new bar of stock from the magazine into said hollow spindle and position its leading end less than the length of an article beyond the cutting off tool for a preliminary trimming operation.

In testimony whereof I have signed my name to this specification.

CHARLES A. RICH.